United States Patent Office 2,916,384
Patented Dec. 8, 1959

2,916,384
LOW CALORIC ITALIAN DRESSING

Henry Simon Bondi, Elmhurst, and Joseph George Spitzer, Mamaroneck, N.Y., assignors, by direct and mesne assignments, to Carter Products, Inc., New York, N.Y., a corporation of Maryland No Drawing. Application September 18, 1957
Serial No. 684,651

2 Claims. (Cl. 99—144)

This invention relates to a low caloric salad dressing and to a method of making the same. More particularly it pertains to a dressing of the character described which simulates the well-known "Italian"-type dressing.

In the production of low caloric foods for people who have to or wish to keep their weight down or for various other reasons are on low calorie diets, probably the most difficult problem, outside of providing foods which satisfy hunger and are nourishing although having a low calorie content, is to provide an appetizing foodstuff which desirably tastes like the food being simulated. The problem is particularly difficult to solve with delicacies, among which many people would classify salads. To many people, salads are the most important and desirable course of a meal. Indeed, salads because of their low calorie content constitute one of the few ordinary types of food which are almost universally recommended for people who are on low calorie diets. Although salad dressings are what impart distinctiveness to a special salad and add life to an ordinary salad, dieting people are denied the pleasures of a good salad dressing because dressings are convenionally very high in caloric content. One of the salad dressings subject to this drawback is "Italian" dressing. Although, of course, all Italian dressings do not taste exactly alike, they have a characteristic taste, consistency, texture, appearance and smell. And although the specific taste is controlled by the particular combinations of ingredients, the basic carrier in Italian dressing is always a salad oil, usually olive oil, which is present in large quantities and which has a very high caloric content.

Attempts have been made from time to time to produce low calorie dressings simulating Italian dressing; the results of such attempts have been unfavorable and the products rejected by the public because they lacked most of the aforementioned physical characteristics of Italian dressing. Moreover, some of the substitutes did not have a long shelf life, i.e., they deteriorated when kept for substantial lengths of time, or lost whatever characteristics of the true product they had.

Generally, the problem of producing a low calorie Italian dressing has defied solution because of the inability to produce a dressing which would have the physical characteristics of Italian dressing attributable to the presence of oil without actually using large quantities of oil. And, in addition, the problem is complicated by the necessity of producing the aforementioned characteristics without interfering with development of a certain established taste.

It is an object of the present invention to provide a salad dressing having a very low calorie content which, nevertheless, simulates ordinary Italian dressing in taste, smell, consistency, texture, color and other physical characteristics.

It is another object of the present invention to provide a salad dressing of the character described which can be varied to specific tastes as is the case with ordinary Italian dressing.

It is another object of the present invention to provide a salad dressing of the character described which is long-lasting and not subject to any special drawbacks as a food and which does not require special handling or treatment to retain its qualities.

It is another object of the present invention to provide a method for producing a dressing of the character described.

It is another object of the present invention to provide a method of the character described which is economical and simple to practice.

Other objects of the present invention in part will be obvious and in part will be pointed out hereinafter.

The invention accordingly consists in the combination of compositions and series of steps which will be exemplified in the compositions and process hereinafter described and of which the scope of application will be indicated in the appended claims.

Ordinary Italian dressings include an oil carrier which usually constitutes a predominant amount, e.g., over one-half by weight of the dressing. In additions, such dressings include water, vinegar, salt, sugar and various spices such as onions, garlic, black pepper and herbs. The relative amounts of the various flavor ingredients create the characteristic taste and smell of this dressing and can, of course, be varied to different tastes. The oil, however, in addition to contributing to the taste of the product, gives the dressing its traditional oily texture and consistency whereby, among other things, it clings to the salad ingredients and produces a particular effect on the palate. An example of a typical Italian dressing follows:

| Ingredients: | Percentage by weight |
|---|---|
| Water | 14.45 |
| Vinegar (distilled), 10% acidity | 20.00 |
| Olive oil | 56.00 |
| Onion flakes | 0.20 |
| Garlic flakes | 0.10 |
| Black pepper | 0.05 |
| Herbs | 0.20 |
| Salt | 4.00 |
| Sugar | 5.00 |
| | 100.00 |

It will be noted that water constitutes only about one-seventh by weight of the dressing, exclusive of vinegar, while the oil constitutes more than one-half. The method of manufacture is as follows: Water, vinegar, herbs, spices, salt and sugar are mixed by agitation. The oil then is run into the mix after which filling can commence. The mixture has to be kept under constant agitation during the filling operation to prevent settling of some of the ingredients with resultant non-uniformity.

Pursuant to the instant invention, oil is not employed as a carrier for the other ingredients of the salad dressing, it being present in a relatively minute amount only to contribute a particular flavor, desirably that of olive oil. The use of oil as the carrier is obviated by employing a carrier comprising water and a special combination of singular ingredients which, when blended together with the other ingredients in accordance with the method of the instant invention, impart the proper texture and consistency to the dressing and give it the characteristic oiliness of Italian dressing. Since less than 5% oil by weight is employed, the dressing has only about two calories per teaspoonful as opposed to about twenty-three calories per teaspoonful of ordinary Italian dressing, this constituting approximately 92% less caloric content.

To carry out the objects of the invention, two special ingredients are employed in critical proportions to create the traditional characteristics of Italian dressing, especially the oleaginous character thereof.

The first of the special ingredients is a gum selected from a particular class of gums which, pursuant to the invention, it has been found, creates a thickening effect and additionally is a predominant factor in securing an oily characteristic in the finished product. This group of gums consists of methyl cellulose, carboxymethylcellulose, and propylene glycol sodium alginate. Preferably, methyl cellulose gum is used. The range in which it is used is highly critical, varying from 0.5% to 0.8% of the dressing by weight. Less than 0.5% is ineffective to create the oily and thickening effect, and when more than 0.8% is used, the product is too thick. The preferred amount is 0.75%. All of the aforementioned gums can be used in the range set forth for methyl cellulose.

Another very important ingredient of the carrier is a gum employed as an emulsifier and to aid in the oil simulation. For this purpose, agar gum or its derivatives, or any hard jellying gum, is employed. Said gum, which also prolongs shelf life, is used in the critical range of 0.25%–0.40% by weight of the dressing, the preferred amount being 0.35%. Less than 0.25% is ineffective, and more than 0.40% produces lumpiness.

The above referred to gums in the critical ranges above set forth, and water, when blended in accordance with the method of the instant invention, produce a carrier of oleaginous characteristics which gives the dressing body and the oily effect whereby it will cling to the salad ingredients. In addition, a mild emulsification is created, and the final product has the viscosity necessary for an Italian type dressing. The unique carrier is highly effective for holding together the other ingredients of the dressing, and the dressing produced therewith has the anticipated effect on the palate. Moreover, the carrier does not interfere with the taste effect of the other ingredients and permits the taste of the dressing to be varied by changing the relative amounts of said ingredients. Still further, the carrier provided herein gives the final product a long shelf life.

To impart the characteristic olive oil flavor, a small amount of olive oil, for example, 3% to 5% by weight, is employed. For the best grades of dressing, prime press, virgin olive oil is used, but any salad oil to which olive flavor has been added can be used. Generally, less than 3% of the oil is insufficient to produce the flavor effect whereas more than 5% adds too much to the caloric content.

For flavoring purposes, chopped capers are employed, preferably in the range of 0.2–0.4% by weight. They simulate a full body flavor, and the range thereof depends on taste acceptability. In addition, cheese such as blue Danish, Rocquefort or any other blue cheese is added, the amount being controlled by the ultimate taste desired. Salt and mono sodium glutamate, glutamic acid or mono ammonium glutamate to enhance the flavor are added, the amounts again being dependent on taste. Likewise, saccharin is used as a low calorie synthetic sweetener as a substitute for sugar, and sodium or calcium cyclamate can also be used; the amount depends on taste acceptability.

Vinegar (10% acidity) is another ingredient and is used in the range of 12.5% to 15% by weight, the preferred amount being 12.5%. Desirably, distilled vinegar is employed. The vinegar is an acidifying agent and its purpose is to add flavor and to serve as a preservative. If less than 12.5% is employed, the preserving action fails, and when vinegar is present in amounts exceeding 15%, the product is inedible. In place of distilled vinegar, cider vinegar, citric acid, malt vinegar or wine vinegar can be employed, the range being the same as that for distilled vinegar.

To impart the characteristic flavor to the dressing, lemon juice and various spicy ingredients are added, including minced onion, garlic, red bell pepper and various other spices and herbs. The amounts of these are governed by taste. In addition, FDC Yellow 5 and FDC Yellow 6 are used in an amount which will give a color simulating that of olive oil.

The following is an example of a dressing employing the instant invention:

| Ingredients: | Percentage by weight |
| --- | --- |
| Methyl cellulose gum | 0.75. |
| Agar gum | 0.35. |
| Olive oil, "prime press" | 4.00. |
| Capers, chopped | 0.3. |
| Cheese, Blue Danish | 0.1. |
| Salt (NaCl) | 5.5. |
| Vinegar (distilled), 10% acidity | 12.5. |
| Mono sodium glutamate | 0.1. |
| Lemon juice | 1. |
| Saccharin | 0.03. |
| Minced onion | 0.6. |
| Minced garlic | 0.5. |
| Minced red bell pepper | 0.06. |
| Herbs and spices | 0.32. |
| FDC Yellow 5 | 0.00063 (trace). |
| FDC Yellow 6 | 0.00004 (trace). |
| Water, q.s. 100%. | |

A comparison of the above example with the example given for regular Italian dressing immediately shows why the dressing produced in accordance with the present invention has such a low actual and comparative caloric content. Almost three-quarters (exclusive of vinegar) of the present dressing comprises water whereas only about one-seventh of the regular Italian dressing (exclusive of vinegar) is water. Moreover, there is only about 4% by weight of the instant dressing comprising the high calorie oil as opposed to over 50% in the regular Italian dressing.

Pursuant to the present invention, a method of producing the above-described salad dressing is provided. Said method includes the following steps: One-fourth of the total amount of water to be used is boiled, and ground up cheese and capers are added and agitated for five minutes so as to sterilize them. Sterilization is necessary to kill bacteria that would cause deterioration of the dressing over a period of time—in other words, sterilization prolongs the shelf life of the product and aids in the preservation thereof. Agar gum is then added and the water is kept close to boiling, between 190° and 212° F., for about ten minutes and the mixture is agitated. In this way complete solution of the gum is achieved. The rest of the water is then added cold while agitation is continued. Next, the spices and herbs and colors are added while the mixture is agitated to make sure all lumps are broken up. Then the temperature is lowered to not higher than 100° F. and the vinegar is added. The reason the temperature is reduced is to prevent any attack by the vinegar on the agar. Salt is then added while agitation is continued; the reason the salt is added later is to prevent any salting out of the agar. Next, to the mixture resulting from the foregoing steps, a mixture of methyl cellulose and olive oil, obtained by intimately mixing these ingredients in a separate kettle for about five minutes, is added. Agitation is continued until all oil and methyl cellulose are dispersed, this taking ordinarily about ten minutes. The product is then ready for filling.

The order of steps is highly important in obtaining a salad dressing meeting the requirements set forth herein. Failure to follow it will have an adverse effect, among other things, on proper distribution of the solids and on the taste.

The viscosity of a product made in accordance with the present invention is in the range of 200 to 500 c.p.s.

measured with a Brookfield viscometer using a No. 2 spindle at 30 r.p.m. at 25° C.

It thus will be seen that there is provided a dressing and method for making the same which achieve the several objects of the present invention and are well adapted to meet the conditions of practical use.

As various possible embodiments might be made of the above invention, and as various changes might be made in the embodiment above set forth, it is to be understood that all matter herein described is to be interpreted as illustrative and not in a limiting sense.

Having thus described the invention, there is claimed as new and desired to secure by Letters Patent:

1. In an Italian dressing, an aqueous carrier of low caloric content having oleaginous characteristics and essentially comprising a gum selected from the group consisting of methyl cellulose, carboxymethylcellulose and propylene glycol sodium alginate, a gum selected from the group consisting of agar gum and derivatives thereof, and a predominant amount of water, the first of said gums being present in an amount ranging from 0.5 to 0.8% by weight of the dressing and the second of said gums being present in an amount ranging from 0.25 to 0.40% by weight of the dressing.

2. A low calorie Italian dressing comprising 0.75% by weight methyl cellulose gum, 0.35% by weight agar gum, 4% by weight olive oil, 0.3% by weight chopped capers, 0.1% by weight Blue Danish cheese, 5.5% by weight sodium chloride, 12.5% by weight distilled vinegar of 10% acidity, 0.1% by weight mono sodium glutamate, 1% by weight lemon juice, 0.03% by weight saccharin, spices, coloring and the balance water.

References Cited in the file of this patent

UNITED STATES PATENTS

| | | |
|---|---|---|
| 2,131,064 | Musher | Sept. 27, 1938 |
| 2,170,518 | Musher | Aug. 22, 1939 |
| 2,344,688 | Folkrod | Mar. 21, 1944 |
| 2,629,665 | Gordon | Feb. 24, 1953 |